United States Patent [19]
Albertazzi

[11] 3,950,856
[45] Apr. 20, 1976

[54] METHOD AND RELEVANT APPARATUS FOR MEASURING THROUGH MOBILE ELEMENTS, THE LONGITUDINAL DEVELOPMENT OF SEATS OF GROOVES IN MECHANICAL WORKPIECES

[75] Inventor: Gastone Albertazzi, Bologna, Italy

[73] Assignee: Finike Italiana Marposs,Soc. In Accomandita Semplice di Mario Possati & C., Bentivoglio, Italy

[22] Filed: Aug. 28, 1974

[21] Appl. No.: 501,339

[30] Foreign Application Priority Data
Sept. 4, 1973  Italy .................................... 3490/73

[52] U.S. Cl. ............................ 33/174 R; 33/125 R; 33/174 L
[51] Int. Cl.² ...................... G01B 5/00; G01B 5/02; G01B 7/00
[58] Field of Search ........... 33/125 R, 174 R, 174 L

[56] References Cited
UNITED STATES PATENTS
2,911,728  11/1959  Mundell et al. .................... 33/174 R
3,840,994  10/1974  Izumi et al. ........................ 33/174 L FOREIGN PATENTS OR APPLICATIONS
144,997  3/1962  U.S.S.R. ............................ 33/174 R Primary Examiner—Richard E. Aegerter
Assistant Examiner—Richard R. Stearns
Attorney, Agent, or Firm—Stevens, Davis, Miller & Mosher

[57] ABSTRACT

A method and apparatus for the precision measurement of the longitudinal development of seats of mechanical workpieces such as side seals for Wankel engines whereby an inextensible element of known length slightly smaller than the theoretical length of the seat is inserted in the seat and displaced along it and the clearance, with respect to the length of the seat, is detected as a consequence of the displacements. The apparatus includes an element adapted to be inserted in the seat, a position transducer coupled to the element and movable arms adapted to displace the element along the seat from a first position in which one of its ends is in correspondence with an end of the seat to a second position in which the other end is in correspondence with the relevant end of the seat. The position transducer detects the amplitude of the displacement.

13 Claims, 4 Drawing Figures

METHOD AND RELEVANT APPARATUS FOR MEASURING THROUGH MOBILE ELEMENTS, THE LONGITUDINAL DEVELOPMENT OF SEATS OF GROOVES IN MECHANICAL WORKPIECES

This invention relates to a method and apparatus for measuring, through mobile elements, the longitudinal development of seats or grooves obtained in mechanical workpieces, more particularly, the invention relates to the precision measurement of the seats for the side seals of the rotors of rotating engines such as Wankel engines.

It is known that in the rotors of engines such as the Wankel engine there are seats for seals and that the sealing is an essential requirement for a good working of the engine.

Therefore, among other things, it is necessary to check that the seals and the seats have a suitable longitudinal development.

The measurements of the geometrical sizes of mechanical workpieces are usually carried out by gauges of various types, for example by gauges including moving arms associated with position transducers and fitted with feelers which are brought into touch with the workpiece.

By these known devices it is not possible to directly measure the development of curved surfaces such as the surfaces for the side seals of the Wankel rotors.

It is therefore an object of the invention to provide a method for the precision measuring of the longitudinal development of seats or grooves of mecahnical workpieces, even if they are not rectilinear, having a length considerably longer than the thickness.

Another object of the invention is to provide an apparatus embodying the method adapted to gauge directly, quickly and accurately, the longitudinal development of seats or grooves being rectilinear or not.

According to the invention, the method for the precision measuring of the longitudinal development of seats or grooves of mechanical workpieces having a thickness relatively thin in comparison with the length foresees that the measurement is carried out by detecting the clearance, with regard to the length of the seat, of an inextensible element of a known length slightly smaller than the theoretical length of the seat, the element being inserted in the seat and displaced along it, with the clearance being detected as a consequence of the displacement.

The apparatus according to the invention includes an element which can be inserted in the seat to be measured and is adaptable to its section and bendable, the element having a length slightly shorter than the nominal development of the seat and being associated with a position transducer and with means adapted to displace the element itself from a first position in which one of its ends is in correspondence with one end of the seat to a second position in which the other end is in correspondence with the relevant end of the seat, the position transducer being adapted to detect the magnitude of such displacement.

The invention will be described now in more detail by reference to the attached drawing given by way of a non-limiting example in which:

FIG. 1 is a plan view of the apparatus made according to the invention adapted to measure the development of the seats for the side seals of a Wankel rotor.

FIG. 2 is a sectional view of a detail of the rotor along line II—II of FIG. 1.

FIG. 3 is a plan view of a detail of the apparatus of FIG. 1.

FIG. 4 is a sectional view along line IV—IV of FIG. 3.

Figures 1, 2, 3, 4:
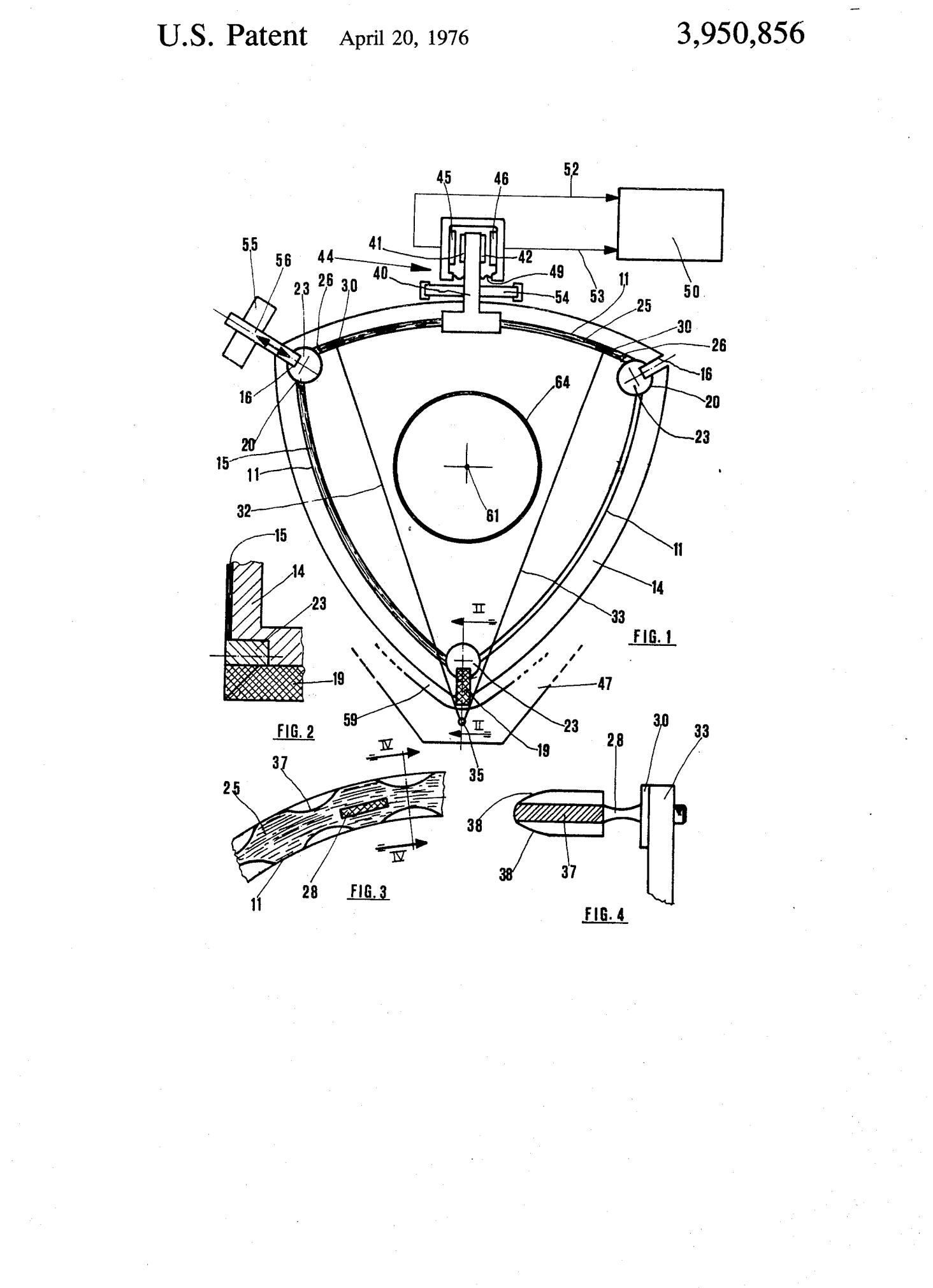

With reference to FIGS. 1 and 2, the illustrated measuring problem is to determine the longitudinal development of seats 11 for the side seals of rotor 14 of a rotating engine of the Wankel type.

A side seal 15 is shown in the Figures, but it should be understood that usually the side seals are not inserted in their seats 11 while the seats are being measured.

In rotor 14 there are seats 16 for apex seals. One of the apex seals, 19, is represented in FIGS. 1, 2 by way of an example.

Seats 11 theoretically developing according to circumferential arcs equal to one another come out at dead holes 20 obtained in rotor 14. These holes 20 house small cylinders 23 with the side surface of the ends of seals 15 being in touch with the cylinders when they are arranged in rotor 14.

The measuring apparatus includes a segment 25 of a known length slightly smaller than the nominal development of seats 11.

Inextensible segment 25 is flexible about axes parallel with the axes of rotor 14 so that it can fit the curving of seat 11.

Ends 26 of segment 25 are shaped so as to ensure a good contact with cylinders 23 and therefore they preferably have the same shape as the ends of seals 15.

Near ends 26 segment 25 is connected, through elastic elements 28 and rigid sectors 30, with arms 32, 33 revolving around axis 35 (FIG. 4).

Segment 25 presents periodical lightenings of the transversal section and its lower part is shaped so as to ease the insertion in seat 11.

Segment 25 is enlarged in FIGS. 3, 4 illustrating reduced sections 37 in correspondence with which the bending deformations take place, and bevels 38 in the lower part.

With the central part of segment 25 a moving arm 40 is rigidly connected supporting two movable armatures 41, 42 of a position transducer 44 of a known type.

The corresponding fixed armatures 45, 46 of the transducer are supported by a base 47 being represented only partly.

An elastic diaphragm 49 seals transducer 44, except for permitting the displacement of moving arm 40.

The transducer is connected with a detecting and indicating instrument 50 through electric cables 52, 53.

With base 47 there is associated a guiding support 54 which supports moving arm 40 and prevents movement in a vertical direction (at right angle with the plane of the drawing).

Additionally, the base supports guides 55 for an axially moving rod 56, whose end is adapted to be inserted in seats 16 of apex seals 19.

Rotor 14 is supported by a slide 59, shown only partly, being movable vertically with respect to base 47 and pivotable around axis 61 coinciding with the axis of rotor 14.

Slide 59 supports a pivot 64 with which rotor 14 is coupled and locked.

The apparatus works as follows.

Initially slide 59 is moved downwardly so as to permit the loading of rotor 14, in whose holes 20 small cylinders 23 are inserted or some elements adapted to take up the holes themselves without any clearance.

Then rotor 14 is loaded and fixed on slide 59.

Afterwards slide 59 is lifted to bring rotor 14 to the measuring position.

Rod 56 advances locking rotor 14 and slide 59.

Segment 25 is inserted in the first seat 11 to be gauged.

It can be carried out either by hand or automatically.

In such a case segment 25 is supported by other arms, not shown, such as arms 32, 33.

Arms 32, 33 and the other possible arms can be stopped, in a way not shown, at preset angular distances, so as to give the segment a bending corresponding to the theoretical bending of seat 11.

The automatic insertion of segment 25 is accomplished by bevels 38 and resilient elements 28, which permit small radial deformations of the segment so that it fits the real (and possibly not constant) curving of seat 11 keeping its tangential stiffness.

After the insertion of segment 25 in seat 11 arms 32, 33 and the other possible analogous ones are released.

Then, preferably by a pneumatically operating system, not shown, arm 32 is rotated in a counterclockwise direction until the left end of segment 25 is brought into touch at a determined pressure with the relevant cylinder 23.

During this rotation arm 33 and the other possible not shown arms can revolve freely around rotation axis 35.

After the above-mentioned contact takes place, instrument 50 detects and stores a signal representative of the (minimum) distance between armatures 41 and 45 of transducer 44.

Then arm 33 is rotated in a clockwise direction around axis 35 (arm 32 can revolve freely now) until the right end of segment 25 contacts the relevant cylinder 23 at an advisable pressure.

Then instrument 50 detects and stores the distance between armatures 42, 46 of transducer 44.

Since the length of segment 25 is known, it is clear that instrument 50 can supply the longitudinal development of seat 11 by simply processing the two stored signals.

After this measurement, in order to measure the development of the other seats 11 of the same face of rotor 14 rod 56 is returned back and slide 59 is moved downward.

Then the slide is rotated by 120 degrees around axis 61.

Slide 59 brings rotor 14 to the measuring position, where it is locked by rod 56.

The measuring operation occurs as already described.

By overturning rotor 14 the seats of the other face can be measured.

The measuring precision which can be achieved by the apparatus described now is within the range of hundredths of millimeters.

Transducer 44 of the above-described apparatus is double to increase its linear operational range.

Of course it is also possible to use a single transducer.

The apparatus can be fully automated both for the loading, unloading and displacement of the rotors and for the fulfillment of the real measuring operations.

Furthermore by simple modifications the apparatus can also be used for measuring seats or gooves with a non-circular development.

Obviously in case of measurements of straight-line seats or grooves flexible segment 25 can be replaced by a rigid segment.

What is claimed is:

1. An apparatus to measure the longitudinal development of seats or grooves of mechanical workpieces, said seats or grooves having a width small in comparison with their length, comprising:

an elongated element having a length slightly smaller than the nominal development of the seat and cross-section and shape permitting the element to be at least partially inserted in the seat to be measured;

position transducer means coupled to said elements; control means coupled to said element for displacing it from a first position in which one of its ends is in correspondence with one end of the seat to a second position in which the other end is in correspondence with the other end of the seat; and processing means connected to said transducer means for providing a signal indicative of the length of said seat.

2. The apparatus according to claim 1 for measuring the length of the seats for the side seals of rotors of Wankel engines, wherein said elongated element is a sector having a flexible construction for permitting the sector to adapt to the bending of the seat to be measured, the sector being capable of flexibly bending around axes parallel with the axis of the rotor.

3. The apparatus according to claim 2, wherein said sector has a variable transverse cross-section, the cross-section having a reduced size in a number of zones for allowing said bending of the sector to take place at said zones.

4. The apparatus according to claim 3, wherein the cross-section of the sector has a beveled shape for making easier the introduction of the sector in the seat to be measured.

5. The apparatus according to claim 2, wherein said control means comprises moving arms coupled to the sector for displacing it and a base for supporting the arms, the apparatus further comprising a slide for carrying the rotor, the slide being mounted on said base for rotation around an axis parallel to the axis of the rotor for rotating the rotor and locking means mounted on said base for locking the rotor and the slide in different angular positions to successively measure all its seats for side seals by means of said elongated element.

6. The apparatus according to claim 5, wherein said locking means comprises a movable rod carried by said base for mechanically cooperating with the surfaces of seats for apex seals of the Wankel rotor to lock the rotor in said measurement positions.

7. The apparatus according to claim 6, wherein said control means comprises resilient elements connecting said sector and said moving arms, for permitting said bending of the sector.

8. The apparatus according to claim 6, wherein said transducer means comprises a member rigidly connected to said sector and movable with the same, at least one mobile armature carried by said member and at least one fixed armature supported by said base.

9. A method for the precision measurement of the longitudinal development of seats or grooves of mechanical workpieces, comprising inserting in the seat an inextensible elongated element of a known length slightly smaller than the theoretical longitudinal development of the seat, displacing the element in said seat in one direction to engage a first end of the seat, and then in the opposite direction to engage the second end of the seat, and detecting the respective positions of said element when it is engaged with said first and second ends to determine the length of said seat.

10. The method according to claim 9, wherein said displacing step of the elongated element comprises carrying out a displacement from a first position, where an end of the element is located in correspondence with the first end of the seat, to a second position, where the other end of the elongated element is located in correspondence with the second end of the seat.

11. The method according to claim 10, wherein said detecting step comprises generating and storing a first electric signal responsive to said first position of the element in the seat; generating and storing a second electric signal responsive to said second position of the element in the seat; and processing said first and second electric signals to obtain the longitudinal development of the seat.

12. The method according to claim 9, wherein said detecting step comprises generating electric signals responsive to said respective positions of the element in the seat.

13. The method according to claim 9, wherein said element is flexible.

* * * * *